US011994184B2

(12) United States Patent
Koduri et al.

(10) Patent No.: US 11,994,184 B2
(45) Date of Patent: May 28, 2024

(54) BRAKE ASSEMBLY WITH TELESCOPIC MULTIPLE BALL SCREW MECHANISM

(71) Applicant: HL MANDO CORPORATION, Pyeongtaek-si (KR)

(72) Inventors: Suersh Babu Koduri, Novi, MI (US); Daniel Smith, Novi, MI (US)

(73) Assignee: HL MANDO CORPORATION, Gyeonggi-Do (KR)

( * ) Notice: Subject to any disclaimer, the term of this patent is extended or adjusted under 35 U.S.C. 154(b) by 330 days.

(21) Appl. No.: 17/575,628

(22) Filed: Jan. 13, 2022

(65) Prior Publication Data

US 2023/0220896 A1    Jul. 13, 2023

(51) Int. Cl.
| | | |
|---|---|---|
| *F16D 55/08* | (2006.01) | |
| *F16D 65/18* | (2006.01) | |
| *F16D 121/24* | (2012.01) | |
| *F16D 125/40* | (2012.01) | |
| *F16D 127/06* | (2012.01) | |

(52) U.S. Cl.
CPC .......... *F16D 65/18* (2013.01); *F16D 2121/24* (2013.01); *F16D 2125/40* (2013.01); *F16D 2127/06* (2013.01)

(58) Field of Classification Search
CPC ...... F16D 55/08; F16D 65/18; F16D 2121/24; F16D 2125/40; F16D 2127/06
USPC ................................ 188/72.7–72.9, 156–162
See application file for complete search history.

(56) References Cited

U.S. PATENT DOCUMENTS

| | | | | |
|---|---|---|---|---|
| 8,136,641 | B2 * | 3/2012 | Wang ...................... | F16D 65/18 188/162 |
| 2007/0029142 | A1 * | 2/2007 | Drennen ................. | F16D 65/18 188/72.1 |
| 2023/0150471 | A1 * | 5/2023 | Knop ...................... | F16D 65/18 188/72.8 |

FOREIGN PATENT DOCUMENTS

| | | |
|---|---|---|
| JP | 11-257389 | 9/1999 |
| JP | 2016-109281 | 6/2016 |

* cited by examiner

*Primary Examiner* — Christopher P Schwartz
(74) *Attorney, Agent, or Firm* — Ladas & Parry, LLP (57) ABSTRACT

A brake assembly with multiple telescoping structures comprises: a rotatable part configured to be rotated by an actuator; a fixed part comprising an outer ball nut fixed to a housing; a rotatable and translatable part comprising an outer ball screw and an inner ball nut, wherein the outer ball screw is operably coupled with the outer ball nut through first rolling bodies, and the rotatable and translatable part is operably coupled with the rotatable part and is rotatable relative to the outer ball nut and axially translatable relative to the rotatable part and the outer ball nut simultaneously by rotation of the rotatable part; a translatable part comprising an inner ball screw operably coupled with the inner ball nut through second rolling bodies and configured to be axially translated relative to the inner ball nut by rotation of the inner ball nut to move a brake pad assembly.

17 Claims, 5 Drawing Sheets

BRAKE ASSEMBLY WITH TELESCOPIC MULTIPLE BALL SCREW MECHANISM

BACKGROUND

Various embodiments of the present disclosure generally relate to brake assemblies for a vehicle and more particularly to a brake assembly with a telescopic multiple ball screw mechanism having a plurality of extensible and retractable ball nuts and screws.

An electro-mechanical brake (EMB) is a brake assembly that is actuated by electrical energy. For example, the EMB system generally provides braking of a vehicle by the use of a motor which becomes selectively energized in response to a signal of an electronic control unit (ECU) or a sensed depression of a brake input means. Generally, the EMB system may include a rotor, a brake caliper, and brake pads on opposing sides of the rotor. The brake caliper is slidably supported on pins secured to an anchor bracket fixed to a non-rotatable component of the vehicle, and includes one or more piston bores, each of which houses a piston that is movable along a piston axis during a brake apply and release of the brake apply. The brake pads are connected to one or more electrically actuated pistons for movement between a non-braking position and a braking position where the brake pads are moved into frictional engagement with the opposed braking surfaces of the rotor. For example, when an operator of the vehicle depresses a brake pedal, an actuator can move the piston into contact with one brake pad and then move one brake pad into contact with one side of the rotor, while another opposing brake pad is moved into contact with an opposing side of the rotor.

By way of example and without limitation, such an EMB system provides the desired braking in a substantially shorter amount of time than that which is provided by a conventional hydraulic braking system and allows each of the individual wheels of a vehicle or other selectively movable assembly to be selectively controlled, thereby enhancing the effectiveness of many operating strategies such as an anti-skid or anti-lock braking strategy or a strategy which is commonly referred to as an integrated vehicular dynamic strategy.

It is with respect to these and other general considerations that the following embodiments have been described. Also, although relatively specific problems have been discussed, it should be understood that the embodiments should not be limited to solving the specific problems identified in the background.

SUMMARY

The features and advantages of the present disclosure will be more readily understood and apparent from the following detailed description, which should be read in conjunction with the accompanying drawings, and from the claims which are appended to the end of the detailed description.

According to various embodiments of the present disclosure, a brake assembly may comprise: a rotatable part configured to be rotated by an actuator; a fixed part comprising an outer ball nut fixed to a housing; a rotatable and translatable part comprising an outer ball screw and an inner ball nut, Wherein the outer ball screw is operably coupled with the outer ball nut of the fixed part through first rolling bodies, and the rotatable and translatable part comprising the outer ball screw and the inner ball nut is operably coupled with the rotatable part and is configured to be rotated relative to the outer ball nut and axially translated relative to the rotatable part and the outer ball nut a the fixed part simultaneously by rotation of the rotatable part; a translatable part comprising an inner ball screw operably coupled with the inner ball nut of the rotatable and translatable part through second rolling bodies, the inner ball screw configured to be axially translated relative to the rotatable and translatable part comprising the outer ball screw and the inner ball nut by rotation of the inner ball nut to move a brake pad assembly; and a brake pad. assembly configured to be movable relative to a rotor in response to axial translation of the inner ball screw of the translatable part.

The rotatable part may have an inner wall forming a cavity, at least a part of the rotatable and translatable part comprising the outer ball screw and the inner ball nut is movable within the cavity of the rotatable part, and one or more grooves may be formed on the inner wall of the rotatable part in an axial direction.

The rotatable and translatable part comprising the outer ball screw and the inner ball nut may have one or more protrusions disposed in the one or more grooves formed on the inner wall of the rotatable part so that the one or more protrusions of the rotatable and translatable part comprising the outer ball screw and the inner ball nut can be slidable along the one or more grooves formed on the inner wall of the rotatable part in the axial direction in response to the rotation of the rotatable part. Two of the grooves formed on the inner wall of the rotatable part may be positioned opposite to each other with respect to a center of the rotatable part. Two of the protrusions of the rotatable and translatable part comprising the outer ball screw and the inner ball nut be positioned opposite to each other with respect to a center of the rotatable and translatable part.

Alternatively, the brake assembly may further comprise one or more keys fixed to the rotatable and translatable part comprising the outer ball screw and the inner ball nut, wherein a part of the one or more keys is slidably disposed in the one or more grooves formed on the inner wall of the rotatable part so that the one or more keys are slidable along the one or more grooves formed on the inner wall of the rotatable part in the axial direction in response to the rotation of the rotatable part. The part of the one or more keys disposed in the one or more grooves formed on the inner wall of the rotatable part may have a substantially spherical shape. Two of the keys fixed to the rotatable and translatable part comprising the outer ball screw and the inner ball nut may be positioned opposite to each other with respect to a center of the rotatable and translatable part.

An outer surface of the rotatable and translatable part comprising the outer ball screw and the inner ball nut may have a stepped shape having a larger diameter portion including the outer ball screw and a smaller diameter portion configured to be slidably coupled with an inner wall of the rotatable part.

The brake assembly may further comprise a bush or bearing positioned between the rotatable part and the housing so that the rotatable part is rotatable relative to the housing.

The brake assembly may further comprise one or more bars disposed between the outer ball screw and the inner ball nut of the rotatable and translatable part so that the one or more bars can fixedly couple between the outer ball screw and the inner ball nut and the outer ball screw and the inner ball nut are fixed together. One or both end portions of the one or more bars disposed between the outer ball screw and the inner ball nut of the rotatable and translatable part may have a larger diameter than a middle portion of the one or more bars.

The brake assembly may further comprise a footing positioned between the brake pad assembly and the translatable part comprising the inner ball screw; the footing fixed to the translatable part comprising the inner ball screw.

The brake assembly may further comprise an actuator comprising: a motor; a first stage belt mechanism including a drive belt, and a driven pulley operably connected to the motor via the drive belt; and a second stage gear mechanism including a drive gear fixedly coupled with the driven pulley of the first stage belt mechanism and rotatably coupled with a gear portion of the rotatable part.

According to some embodiments of the present disclosure, a brake assembly may comprise: a plurality of ball-screw mechanisms, each of the plurality of ball-screw mechanisms comprising: a rotatable part, a fixed part comprising an outer ball nut fixed to a housing, a rotatable and translatable part comprising an outer ball screw and an inner ball nut, wherein the outer ball screw is operably coupled with the outer ball nut of the fixed part through first rolling bodies, and the rotatable and translatable part comprising the outer ball screw and the inner ball nut is operably coupled with the rotatable part and is configured to be rotated relative to the outer ball nut and axially translated relative to the rotatable part and the outer ball nut of the fixed part simultaneously by rotation of the rotatable part, and a translatable part comprising an inner ball screw operably coupled with the inner hall nut of the rotatable and translatable part through second rolling bodies, the inner ball screw configured to be axially translated relative to the rotatable and translatable part comprising the outer ball screw and the inner ball nut by rotation of the inner ball nut to move a brake pad assembly; an actuator configured to rotate one rotatable part of one of the plurality of ball-screw mechanisms; an idler rotatably connecting between the one rotatable part of the one of the plurality of ball-screw mechanisms and an other rotatable part of an other of the plurality of ball-screw mechanisms, the idler configured to transmit rotation from the one rotatable part of the one of the plurality of ball-screw mechanisms to the other rotatable part of the other of the plurality of ball-screw mechanisms; and a brake pad assembly, wherein each translatable part of each of the plurality of ball-screw mechanisms is operably connected to the brake pad assembly, and the brake pad assembly is configured to be movable relative to a rotor in response to axial translation of each translatable part of each of the plurality of ball-screw mechanisms.

Each of the plurality of ball-screw mechanisms may comprise a footing positioned between the brake pad assembly and the translatable part comprising the inner ball screw, the footing fixed to the translatable part comprising the inner ball screw, and structured to provide uniform brake pressure distribution.

The footing may have one of an oval shape, a round shape, or a polygonal shape.

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Various embodiments in accordance with the present disclosure will be described with reference to the drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF EMBODIMENTS

In the following detailed description, reference is made to the accompanying drawings which form a part of the present disclosure, and in which are shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is therefore not to be taken in a limiting sense, and the scope of the invention is defined only by the appended claims and equivalents thereof. Like numbers in the figures refer to like components, which should be apparent from the context of use.

Referring to FIGS. 1 to 4B, a brake assembly 10 may include a brake caliper 110. The brake caliper 110 may be mounted in a floating manner by means of a brake carrier. The brake caliper 110 may be connected to any non-rotating or non-moving part of a vehicle. When the vehicle is in motion, a brake rotor 125 may rotate with a wheel about an axle of the vehicle. A brake pad assembly (or brake lining assembly) 120 is provided in the brake caliper 110, and includes a brake pad or lining 121 and a brake pad (or lining) carrier 122. The brake caliper 110 may include a bridge with fingers, and the fingers of the brake caliper 110 may be in contact with the brake pad carrier 122. The brake pad 121 is disposed with a small air clearance on a side of a brake rotor 125, such as a brake disc, in a release position so that no significant residual drag moment occurs. The brake pad carrier 122-1 is disposed between the brake pad 121-1 and a brake pad footing 205, the brake pad 121 and the brake pad carrier 122 move jointly together, and the movement of the brake pad carrier 122 causes the brake pad 121 to move with respect to the brake rotor 125.

The brake assembly 10 may comprise a ball-screw mechanism 200 configured to convert rotary motion generated by an actuator assembly 500 into linear motion in order to move the brake pad assembly 120 toward or away from the brake rotor 125 in an axial direction.

The ball-screw mechanism 200 is contained within a housing 600. The ball-screw mechanism 200 include the plurality of threaded tiers or segments. While four threaded segments are illustrated in the exemplary embodiments of FIGS. 1 and 2, many more segments could be used depending upon the application. The ball-screw mechanism 200 may have multiple concentric (or tiered) telescoping structures to produce a telescoping motion so that the ball-screw mechanism 200 can be expanded or retracted.

The ball-screw mechanism 200 may include (i) a rotatable part 210, (ii) a fixed part 220 comprising an outer ball nut 221, (iii) a rotatable and translatable part 230 comprising an outer ball screw 231 and an inner ball nut 232, and (iv) a translatable part 240 comprising an inner ball screw 241 The rotatable part 210, the fixed part 220 comprising the outer ball nut 221, the rotatable and translatable part 230 comprising the outer ball screw 231 and the inner ball nut 232, and the translatable part 240 comprising the inner ball screw 241 may be concentrically mounted in a cavity formed by an inner wall of the housing 600. The housing 600 may be fixedly coupled with the brake caliper 110.

Figure 3A:
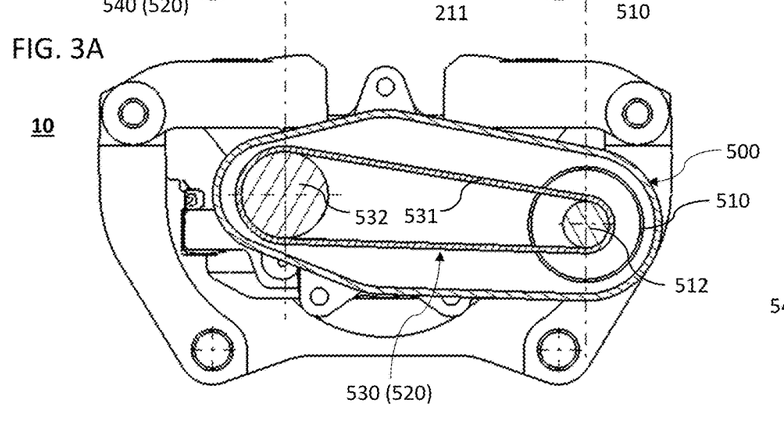
FIG. 3A is a cross-sectional view of a first stage of a multi-stage drive mechanism of a brake assembly according to an exemplary embodiment of the present disclosure.

The rotatable part 210 is configured to be rotatable by the actuator assembly 500. The actuator assembly 500 may comprise a motor 510 fixedly mounted in the housing 600. The motor 510 may rotate a drive pully 512 attached to, or directly formed on, a motor shaft. The drive pully 512 is rotatably engaged with a multi-stage drive mechanism 520. In the exemplary embodiment, the multi-stage drive mechanism 520 may be a dual-stage drive mechanism comprising a first stage belt assembly 530 of FIG. 3A and a second stage gear assembly 540 of FIG. 3B. The multi-stage drive mechanism 520 may be configured to multiple torque from the motor 510 to supply braking force to the brake caliper 110. As shown in FIG. 3A, the first stage belt assembly 530 may comprise a drive belt 531 and a first stage driven pully 532. The drive pully 512 of the motor 510 and the first stage driven pully 532 are rotatably connected to each other vice the drive belt 531. Each of the drive pully 512 and the first stage driven pulley 532 has an outer surface that engages an inner surface of the drive belt 521. The surfaces of the drive pulley 512 and the first stage driven pulley 532 can have any suitable contour or texture to help ensure a gripping contact between the drive belt 531 and the pulleys 512, 532. For example, the surfaces of the pulleys 512 and 532 and the inner surface of the belt 531 can include toothed mating protruding and/or notches formed therein.

Figure 3B:
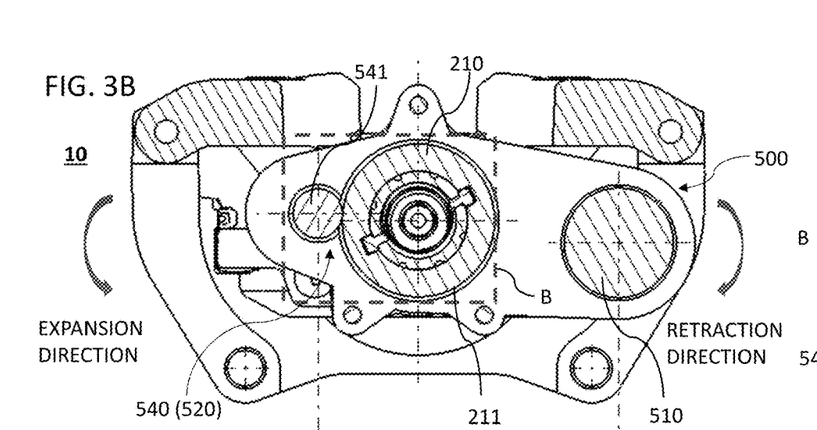
FIG. 3B is a cross-sectional view of a second stage of a multi-stage drive mechanism of a brake assembly according to an exemplary embodiment of the present disclosure.

As shown in FIG. 3B, the multi-stage drive mechanism 520 further comprises the second stage gear assembly 540. The first stage belt assembly 530 of FIG. 3A is operably connected to the second stage gear assembly 540 of FIG. 3B. In the exemplary embodiment, the first stage driven pulley 532 of the first stage belt assembly 530 of FIG. 3A is fixedly coupled to a second stage drive gear 541 of the second stage gear assembly 540 of FIG. 3B in order to deliver torque of the first stage driven pulley 532 to the second stage drive gear 541. For example, the first stage driven pulley 532 may be directly coupled to the second stage drive gear 541, or indirectly fixed to the second stage drive gear 541 through a shaft fixedly coupled therebetween. In operation, the first stage belt assembly 530 multiplies the torque from the motor 510 by using the drive pully 512 of the motor 510 and the first stage driven pulley 532 of the first stage belt assembly 530 rotatably connected by the drive belt 531, and the torque multiplied by the first stage belt assembly 530 is delivered to the second stage gear assembly 541 by fixedly connecting the first stage driven pulley 532 of the first stage belt assembly 530 and the second stage drive gear 541 of the second stage gear assembly 540 to each other so that the first stage driven pulley 532 and the second stage drive gear 541 can rotate jointly together.

The second stage drive gear 541 of the second stage gear assembly 540 and the rotatable part 210 of the ball-screw mechanism 200 are rotatably connected with each other. The rotatable part 210 of the ball-screw mechanism 200 may have a gear portion 211 rotatably coupled to the second stage drive gear 541. Each of the gear portion 211 of the rotatable part 210 of the ball-screw mechanism 200 and the second stage drive gear 541 of the second stage gear assembly 540 has an outer surface that engages each other. The outer surfaces of the gear portion 211 of the rotatable part 210 of the ball-screw mechanism 200 and the second stage drive gear 541 of the second stage gear assembly 540 can have any suitable structure, contour or texture to help ensure a contact between the gear portion 211 of the rotatable part 210 and the second stage drive gear 541. For example, the outer surfaces of the gear portion 211 of the rotatable part 210 and the second stage drive gear 541 can include toothed mating protruding and/or notches formed thereon.

Alternatively, the motor 510 may be directly connected to the rotatable part 210 of the ball-screw mechanism 200 without the multi-stage drive mechanism 520, the first stage belt assembly 530 may be replaced with a gear type assembly (such as the second stage gear assembly 540), or the second stage gear assembly 540 may be replaced with a belt type assembly (such as the first stage belt assembly 530).

One or more bushes or bearings 212 may be positioned between the rotatable part 210 of the ball-screw mechanism 200 and the housing 600 to support the rotatable part 210 for rotation.

Accordingly, the motor 510 rotates the rotatable part 210 of the ball-screw mechanism 200 through the multi-stage drive mechanism 520, and then the ball-screw mechanism 200 converts the rotary motion of the rotatable part 210 to the linear motion of the brake pad footing 205 to move the brake pad assembly 120 between its brake apply and release positions.

The actuation of the actuator 500 causes the rotatable part 210 to rotate, and the rotation of the rotatable part 210 causes the rotatable and translatable part 230 comprising the outer ball screw 231 and the inner ball nut 232 to be rotated as well as linearly moved simultaneously and at the same time. The rotatable part 210 has a tubular shape with axially open ends, and the rotatable and translatable part 230 comprising the outer ball screw 231 and the inner ball nut 232 is received within an inside space of the rotatable part 210. The rotatable part 210 and the rotatable and translatable part 230 comprising the outer ball screw 231 and the inner ball nut 232 are operably connected to each other such that while the rotatable and translatable part 230 comprising the outer ball screw 231 and the inner ball nut 232 can be rotated together with the rotatable part 210, the rotatable and translatable part 230 is linearly movable relative to the rotatable part 210. In other words, the rotatable and translatable part 230 comprising the outer ball screw 231 and the inner ball nut 232 is slidable with respect to the rotatable part 210, but the rotatable and translatable part 230 comprising the outer ball screw 231 and the inner ball nut 232 cannot be rotatable relative to the rotatable part 210 and therefore as the rotatable part 210 rotates, the rotatable and translatable part 230 comprising the outer ball screw 231 and the inner ball nut 232 rotates together with the rotatable part 210.

Figure 3C:
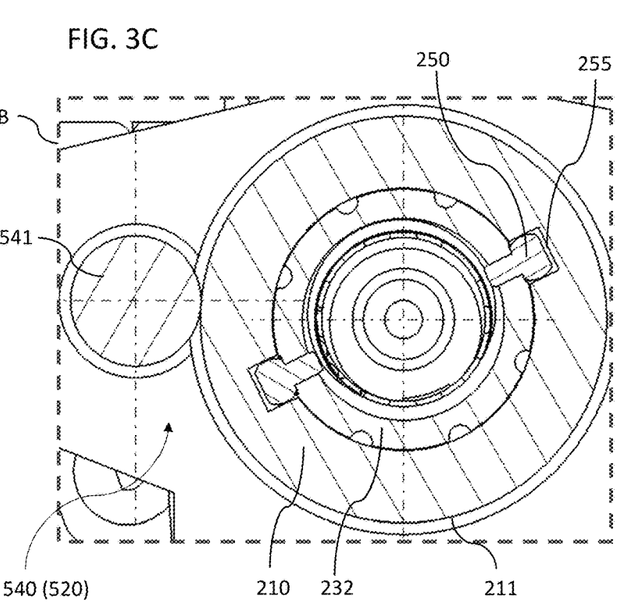
FIG. 3C is an enlarged view of a square portion B shown in FIG. 3B according to an exemplary embodiment of the present disclosure.

The rotatable and translatable part 230 comprising the outer ball screw 231 and the inner ball nut 232 can be rotated and translated simultaneously using connection means such as a protrusion 250. The rotatable and translatable part 230 comprising the outer ball screw 231 and the inner ball nut 232 is keyed to the inner wall of the rotatable part 210 to prevent the outer ball screw 231 and the inner ball nut 232 from rotating relative to the rotatable part 210. The protrusion 250 protrudes from the outer surface of the rotatable and translatable part 230. For example, as shown in FIGS. 3B and 3C, the protrusion 250 can be implemented as a key. A groove 255 is formed on the inner wall of the rotatable part 210 in an axial direction, and the protrusion 250 is fixed to, or formed on, the rotatable and translatable part 230 comprising the outer ball screw 231 and the inner ball nut 232 and is slidably inserted in the groove 255 of the rotatable part 210 to prevent the rotatable and translatable part 230 comprising the outer ball screw 231 and the inner ball nut 232 from rotating relative to the rotatable part 210 while allowing the rotatable and translatable part 230 comprising the outer ball screw 231 and the inner ball nut 232 to translate in the axial direction along the groove 255 of the rotatable part 210. The rotatable and translatable part 230 comprising the outer ball screw 231 and the inner ball nut 232 is not prevented from moving axially, and the protrusion 250 (e.g. a key) is provided for purposes of securing the rotatable and translatable part 230 comprising the outer ball screw 231 and the inner ball nut 232 which is prevented from being rotated relative to the rotatable part 210 while permitting its axial movement. Accordingly, when the rotatable part 210 rotates, the rotatable and translatable part 230 comprising the outer ball screw 231 and the inner ball nut 232 is rotated together with the rotatable part 210 and is translatable in the axial direction with respect to the rotatable part 210.

A part of the protrusion 250 of the rotatable and translatable part 230 disposed in the groove 255 of the rotatable part 210 may have a substantially spherical shape in order to be smoothly slidable along the groove 255 of the rotatable part 210.

A plurality of protrusions 250 may be fixed to, or formed on, the rotatable and translatable part 230 comprising the outer ball screw 231 and the inner ball nut 232, and a plurality of grooves 255 may be formed on the inner wall of the rotatable part 210 on locations corresponding to the protrusions 250 of the rotatable and translatable part 230. For example, two of the protrusions 250 of the rotatable and translatable part 230 may be positioned opposite to each other with respect to a center of the rotatable and translatable part 230, and two of the grooves 255 of the rotatable part 210 may be positioned opposite to each other with respect to a center of the rotatable part 210. As shown illustrated in FIGS. 3B and 3C, the protrusion 250 (e.g. a key) may be fixed to, or formed on, the inner ball nut 232. Alternatively, the protrusion 250 (e.g. a key) may be fixed to, or formed on, the outer ball screw 231. In an alternative exemplary embodiment of the present disclosure, the protrusion 250 (e.g. a key) may be fixed to, or formed on, the inner surface of the rotatable part 210, and the groove 255 may be formed on the outer surface of the rotatable and translatable part 230 comprising the outer ball screw 231 and the inner ball nut 232

The outer ball screw 231 may form an outer portion of the rotatable and translatable part 230, and the inner ball nut 232 may form an inner portion of the rotatable and translatable part 230. The outer surface of the rotatable and translatable part 230 may have a stepped shape having a larger dimeter portion 233 and a smaller diameter portion 234. The larger diameter portion 233 of the rotatable and translatable part 230 may have the outer ball screw 231. And, the inner circumferential surface of the rotatable part 210 may be slidably coupled on the outer circumferential surface of the smaller portion 234 of the rotatable and translatable part 230 so that the rotatable and translatable part 230 can linearly translate relative to the rotatable part 210.

Figure 4A:
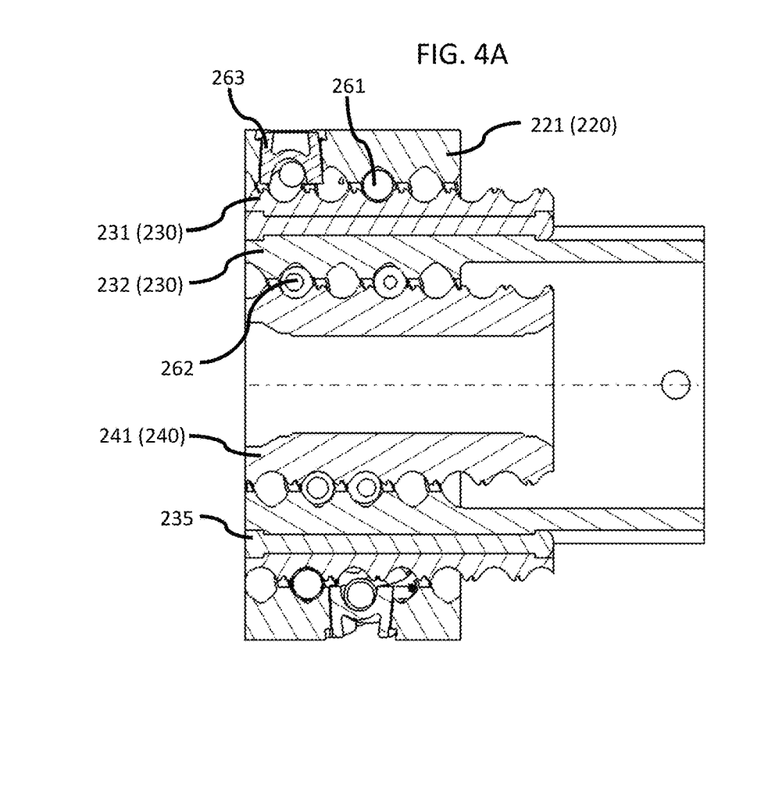
FIG. 4A is a partial cross-sectional view of a ball-nut mechanism of a brake assembly according to an embodiment of an exemplary embodiment of the present disclosure.
Figure 4B:
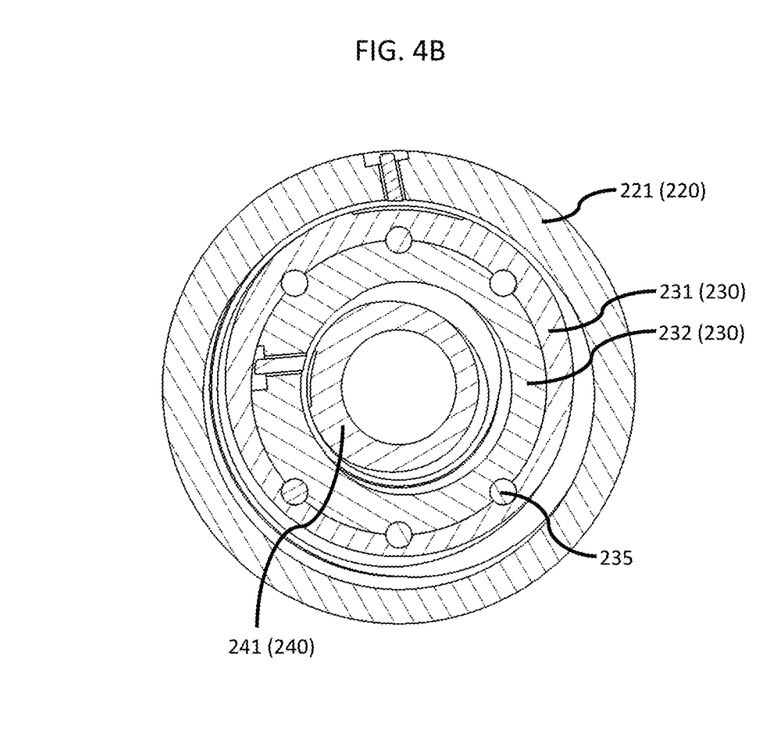
FIG. 4B is a cross-sectional view of a ball-nut mechanism of a brake assembly according to an embodiment of an exemplary embodiment of the present disclosure.

The outer ball screw 231 and the inner ball nut 232 are fixed together to form a rotatable and translatable part 230, or are formed as a single integrated piece. As illustrated in FIGS. 4A and 4B, the outer ball screw 231 and the inner ball nut 232 may be integrated with one or more bars 235 to reduce an axial packaging space. One or more bars 235 may be disposed between the outer ball screw 231 and the inner ball nut 232 so that the bars 235 can couple between the outer ball screw 231 and the inner ball nut 232, and the outer ball screw 231 and the inner ball nut 232 can move together. The bar 235 can keep the outer ball screw 231 and the inner ball nut 232 together while rotating and translating. Each of the outer ball screw 231 and the inner ball nut 232 may have one or more grooves to receive the bars 235 therein. One or both end portions of the bar 235 (e.g. a head of the bar 235) disposed between the outer ball screw 231 and the inner ball nut 232 of the rotatable and translatable part 230 may have a larger diameter than a middle portion of the bar 235 to securely couple between the outer ball screw 231 and the inner ball nut 232.

At least a part of the rotatable and translatable part 230 comprising the outer ball screw 231 and the inner ball nut 232 is retained within the fixed part 220 comprising the outer ball nut 221. The outer ball nut 221 of the fixed part 220 may be fixed to an inner wall of the housing 600 and has an internally-threaded track groove for a rolling body arrangement of first rolling bodies 261 (e.g. balls). The first rolling bodies 261 are disposed between the internally-threaded track groove of the outer ball nut 221 and the externally-threaded track groove of the outer ball screw 231 of the rotatable and translatable part 230. Ball returns either internally or externally carry the first rolling bodies 261 from the end of their path back to the beginning to complete their recirculating track. For example, a return tube 263 can perform recirculation of the first rolling bodies 261. The internally-threaded track groove of the outer ball nut 221 and the externally-threaded track groove of the outer ball screw 231 form a series of ball tracks to provide a helical raceway for reception of a train of recirculating the first rolling bodies 261. The first rolling bodies 261 may be metal spheres which decrease friction and transfer loads between adjacent component. The rotatable and translatable part 230 comprising the outer ball screw 231 and the inner ball nut 232 is rotatably supported by the outer ball nut 221 of the fixed part 220 via the first rolling bodies 261. The rotatable and translatable part 230 comprising the outer ball screw 231 and the inner ball nut 232 can rotate relative to the outer ball nut 221 fixed to the housing 600, and the rotation of the rotatable and translatable part 230 comprising the outer ball screw 231 and the inner ball nut 232 relative to the outer ball nut 221 causes to the rotatable and translatable part 230 advance or retract axially depending on a direction of rotation of the rotatable part 210. As the rotatable part 210 rotates in an expanding direction, the rotatable and translatable part 230 comprising the outer ball screw 231 and the inner ball nut 232 rotates together with the rotatable part 210 in the expanding direction, and at the same time linearly translates with respect to the rotatable part 210 and the outer ball nut 221 of the fixed part 220 so that the rotatable and translatable part 230 comprising the outer ball screw 231 and the inner ball nut 232 can translate out from the rotatable part 210 and the outer ball nut 221 of the fixed part 220. As the rotatable part 210 rotates in a collapsing direction, the rotatable and translatable part 230 comprising the outer ball screw 231 and the inner ball nut 232 rotates together with the rotatable part 210 in the collapsing direction, and at the same time linearly translates with respect to the rotatable part 210 and the outer ball nut 221 of the fixed part 220 so that the rotatable and translatable part 230 comprising the outer ball screw 231 and the inner ball nut 232 can linearly move toward the rotatable part 210 and the outer ball nut 221 of the fixed part 220.

While the expanding or collapsing direction depends upon whether the outer ball nut 221, the outer ball screw 231 and the inner ball nut 232, and the inner ball screw 241 are left-handed or right-handed, a specific direction is not critical to some embodiments of the present disclosure, and most embodiments of the present disclosure can work with either.

The inner ball screw 241 of the translatable part 240 may be concentrically mounted in a cavity formed by an inner wall of the inner ball nut 232 of the rotatable and translatable part 230 and has an externally-threaded track groove for a rolling body arrangement of second rolling bodies 262 (e.g. balls). The inner ball screw 241 of the translatable part 240 is restricted or prevented from rotating relative to the housing 600, or about an axis A-A of the ball-screw mechanism 200. A boot seal 270 is connected between the housing 600 and the brake pad footing 205. For example, the boot seal 270 may be an as-molded disc brake boot seal and comprise an annular, molded, unitary one-piece, flexible elastomeric sleeve that is extensible from a collapsed condition to an extended condition depending on the linear movement of the brake pad footing 205. The boot seal 270 may help in preventing the rotation of the translatable part 240 comprising the inner ball screw 241, but allow the translatable part 240 comprising the inner ball screw 241 to be linearly translatable by deforming between a collapsed shape and an extended shape.

The second rolling bodies 262 are disposed between the externally-threaded track groove of the inner ball screw 241 and the internally-threaded track groove of the inner ball nut 232 of the rotatable and translatable part 230. The inner ball screw 241 of the translatable part 240 is translatably or linearly movably supported by the inner ball nut 232 of the rotatable and translatable part 230 via the second rolling bodies 262. Ball returns either internally or externally carry the second rolling bodies 262 from the end of their path back to the beginning to complete their recirculating track. For example, a return tube can perform recirculation of the second rolling bodies 262. The rotatable and translatable part 230 comprising the outer ball screw 231 and the inner ball nut 232 can rotate relative to the inner ball screw 241 of the translatable part 240, and the rotation of the rotatable and translatable part 230 comprising the outer ball screw 231 and the inner ball nut 232 relative to the inner ball screw 241 of the translatable part 240 causes to the inner ball screw 241 of the translatable part 240 advance or retract axially depending on the direction of the rotation of the rotatable and translatable part 230.

Figure 2:
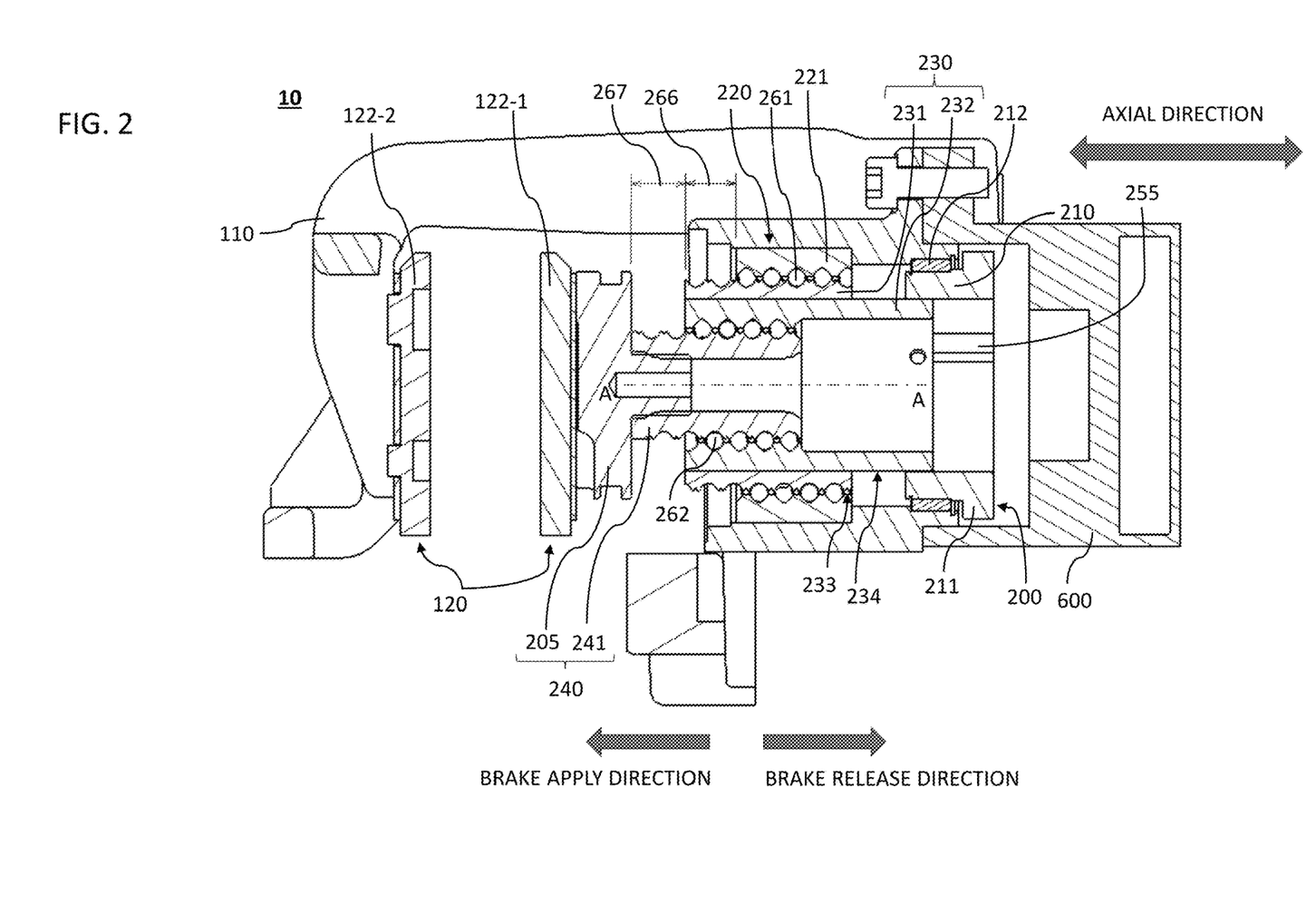
FIG. 2 is a cross-sectional view of a brake assembly in a fully expanded state according to an exemplary embodiment of the present disclosure.

Accordingly, as illustrated in FIG. 2, the linear expansion movement of the rotatable and translatable part 230 comprising the outer ball screw 231 and the inner ball nut 232 by a first distance 266, caused by the rotation of the rotatable part 210 in the expanding direction, can cause the inner ball screw 241 of the translatable part 240 to linearly move by the first distance 266. At the same time, as the rotatable and translatable part 230 comprising the outer ball screw 231 and the inner ball nut 232 rotates in the expanding direction with respect to the inner ball screw 241 of the translatable part 240, the inner ball screw 241 of the translatable part 240 linearly translate out from the rotatable and translatable part 230 comprising the outer ball screw 231 and the inner ball nut 232 by a second distance 267. Hence, the ball-screw mechanism 200 can be extended to a length that combines the first distance 266 and the second distance 267, and therefore the ball-screw mechanism 200 can provide compact length and reduce an axial packaging space to about 50%. Additionally, the ball-screw mechanism 200 can achieve reduction in brake apply or release time as well as multiplication of the force of the actuator 500. Therefore, the ball-screw mechanism 200 may increase efficiency of the brake assembly 10.

The brake pad footing 205 is fixedly coupled to the inner ball screw 241 of the translatable part 240 so that the brake pad footing 205 can be linearly movable together with the inner ball screw 241 of the translatable part 240. When the ball-screw mechanism 200 is in the expanded state (e.g. FIG. 2), the brake pad footing 205 pushes the brake pad assembly 120 toward the brake rotor 125. When the ball-screw mechanism 200 is in the collapsed state (e.g. FIG. 1), the brake pad footing 205 moves away from the brake rotor 125.

Operation of brake of the brake assembly 10 will now be described. It is understood that these operations or method steps can be performed in virtually any order, and one or more of the operations or steps described herein may be changed, combined, omitted or repeated.

Figure 1:
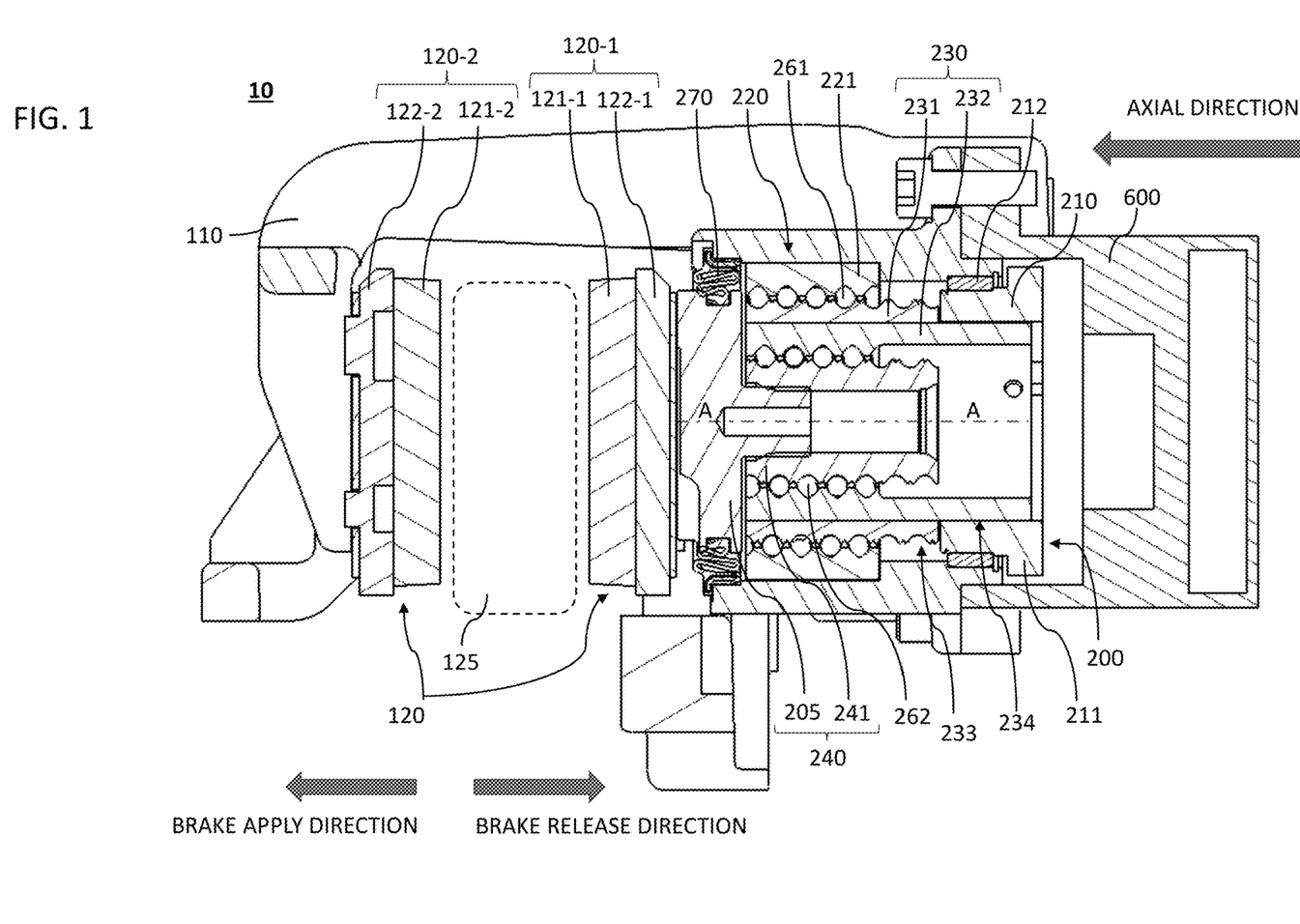
FIG. 1 is a cross-sectional view of a brake assembly in a fully collapsed state according to an exemplary embodiment of the present disclosure.

For activating brake of the brake assembly 10 in a fully collapsed state shown in FIG. 1, where the ball-screw mechanism 200 is fully retracted and there is a clearance between the brake pad 121 and the brake rotor 125, a signal may be transmitted by an electronic control unit (ECU) or a controller to the actuator assembly 500 to apply the brake to the rotor 125. In response to the signal of the ECU, the actuator assembly 500 provides a rotation force to the rotatable part 210 of the ball-screw mechanism 200 in an expansion direction. For example, the motor 510 imparts rotation to the rotatable part 210 of the ball-screw mechanism 200 through the multi-stage drive mechanism 520. The rotation of the rotatable part 210 of the ball-screw mechanism 200 in the expansion direction causes the rotatable and translatable part 230 comprising the outer ball screw 231 and the inner ball nut 232 to rotate in the expansion direction as well as travel axially towards the brake pad assembly 120 (or the rotor 125) in the brake apply direction simultaneously at the same time. The rotatable and translatable part 230 comprising the outer ball screw 231 and the inner ball nut 232 is rotated and translated relative to the outer ball nut 221 of the fixed part 220, operably coupled with the outer ball screw 231 and fixed to the housing 600, in response to the rotation of the rotatable part 210 of the ball-screw mechanism 200 in the expansion direction. By the rotation and translation of the rotatable and translatable part 230 comprising the outer ball screw 231 and the inner ball nut 232 in the expansion direction and the brake apply direction, the inner ball screw 241 of the translatable part 240 operatable coupled with the inner ball nut 232 of the rotatable and translatable part 230 is linearly translated in the brake apply direction relative to both the fixed part 220 comprising the outer ball nut 221 and the rotatable and translatable part 230 comprising the outer ball screw 231 and the inner ball nut 232 as illustrated in FIG. 2, where the brake assembly 10 is in a fully expanded state. Thus, the brake pad footing 205 fixed to the inner ball screw 241 of the translatable part 240 is translated axially towards the rotor 125, thereby pushing the inner brake pad assembly 120-1 against the rotor 125. The motor 510 continues to rotate the rotatable part 210 of the ball-screw mechanism 200 to simultaneously rotate and translate the rotatable and translatable part 230 comprising the outer ball screw 231 and the inner ball nut 232 in the expansion direction and the brake apply direction and then linearly move the translatable part 240 including the inner ball screw 241 and the brake pad footing 205 in the brake apply direction until the clearance between the brake pad 121 and the brake rotor 125 is removed. Once the inner brake pad assembly 120-1 contacts the rotor 125, a reaction force is generated through the ball-screw mechanism 200 and the brake caliper 110, and then causes the brake caliper 110 to push the outer brake pad assembly 120-2 towards the rotor 125. Accordingly, the continued rotation and linear movement of the outer ball screw 231 and the inner ball nut 232 of the rotatable and translatable part 230 and thus translation of the inner ball screw 241 and the brake pad footing 205 of the translatable part 240 moves or pushes the brake pad assemblies 120 against the rotor 125 to generate the create friction or clamping force necessary to slow down the vehicle or present movement of the vehicle.

To release the brake of the brake assembly 10 in a fully expanded state shown in FIG. 2, where the ball-screw mechanism 200 is fully extended and the brake pad assemblies 120 pushes against the rotor 125, the ECU or controller may transmit a signal for the brake release to the actuator assembly 500. In response to the signal for the parking brake release, the actuator assembly 500 provides a rotation force to the rotatable part 210 of the ball-screw mechanism 200 in an opposing direction (i.e. a retraction direction), which is opposite to the expansion direction in which the rotatable part 210 is rotated during the brake apply operation. For example, the motor 510 imparts rotation to the rotatable part 210 of the ball-screw mechanism 200 through the multi-stage drive mechanism 520. The rotation of the rotatable part 210 of the ball-screw mechanism 200 in the retraction direction causes the rotatable and translatable part 230 comprising the outer ball screw 231 and the inner ball nut 232 to rotate in the retraction direction as well as travel axially away from the brake pad assembly 120 (or the rotor 125) in the brake release direction simultaneously at the same time. The rotatable and translatable part 230 comprising the outer ball screw 231 and the inner ball nut 232 is rotated in the retraction direction and translated relative to the outer ball nut 221 of the fixed part 220 operably coupled with the outer ball screw 231 and fixed to the housing 600 in response to the rotation of the rotatable part 210 in the retraction direction. By the rotation and translation of the rotatable and translatable part 230 comprising the outer ball screw 231 and the inner ball nut 232 in the retraction direction, the inner ball screw 241 of the translatable part 240 operatable coupled with the inner ball nut 232 is linearly translated in the brake release direction relative to the fixed part 220 comprising the outer ball nut 221 and the rotatable and translatable part 230 comprising the outer ball screw 231 and the inner ball nut 232 as illustrated in FIG. 1, where the brake assembly 10 is in a fully collapsed state. Thus, the brake pad footing 205 fixed to the inner ball screw 241 of the translatable part 240 is translated axially away from the rotor 125. The linear movement of the brake pad footing 205 fixed to the inner ball screw 241 of the translatable part 240 in the brake release direction may make the inner brake pad assembly 120-1 and the outer brake pad assembly 120-2 free to relax and move away from the rotor 125 so that the clamping force of the brake pad assembly 120 against the rotor 125 can be released.

The multiple telescoping structures of the ball-screw mechanism 200 can provide sufficient extension for the brake pad assembly 120 to reach the rotor 125 and have sufficient force to provide brake. Additionally, the multiple telescoping structures of the ball-screw mechanism 200 can provide greater travel in a smaller package and have a simpler structure than a conventional brake assembly. Further, the multiple telescoping structures of the ball-screw mechanism 200 can reduce brake apply and release time and increase the efficiency of brake operation of the brake assembly 10.

Figure 5A:
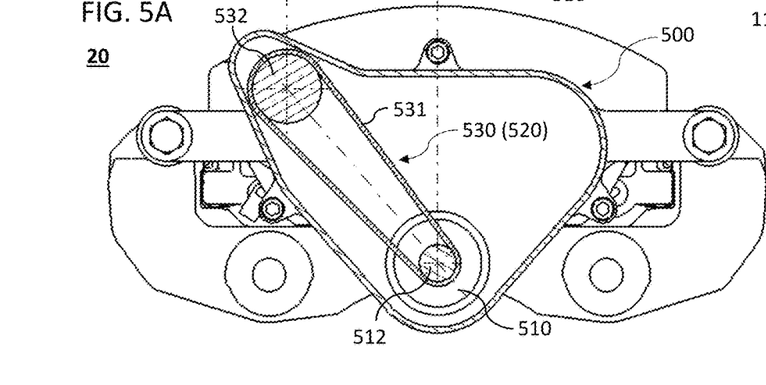
FIG. 5A is a cross-sectional view of a first stage of a multi-stage drive mechanism of a brake assembly according to another exemplary embodiment of the present disclosure.
Figure 5B:
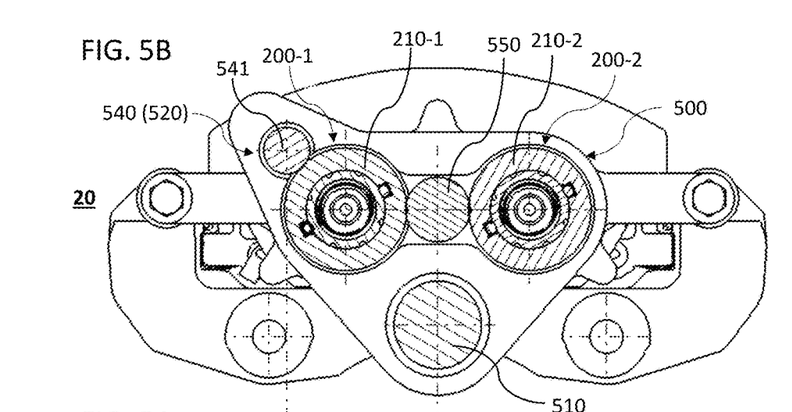
FIG. 5B is a cross-sectional view of a second stage of a multi-stage drive mechanism of a brake assembly according to another exemplary embodiment of the present disclosure.
Figure 5C:
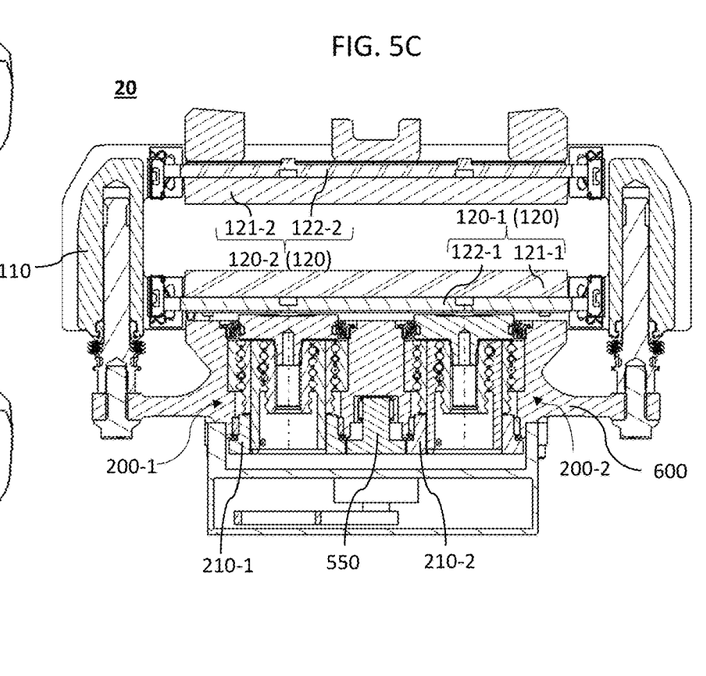
FIG. 5C is a cross-sectional view of a brake assembly according to another exemplary embodiment of the present disclosure.

FIGS. 5A to 5C illustrate a brake assembly having multiple ball-screw mechanisms according to another embodiment of the present disclosure.

While the exemplary embodiment of the brake assembly 10 shown in FIGS. 1 to 4B has a single ball-screw mechanism 200 with a single axis, a brake assembly may include two or more ball-screw mechanisms with multi axes for a larger brake system. For example, as illustrated in FIGS. 5A to 5C, a brake assembly 20 comprises multiple ball-screw mechanisms including a first ball-screw mechanism 200-1 and a second ball-screw mechanism 200-2. Operations, functions, structures, and features of the first and second ball-screw mechanisms 200-1 and 200-2 of FIGS. 5A to 5C are the same as, or substantially similar to, the ball-screw mechanism 200 of FIGS. 1, 2 and 3C to 4B described above. It should be understood that structures, features, materials, operations and functions not specifically discussed with respect to the exemplary embodiment of FIGS. 5A to 5C can be the same as or similar to the exemplary embodiment of FIGS. 1 to 4B. Any elements not described in relation to the exemplary embodiment of FIGS. 5A to 5C can be found in the descriptions of the exemplary embodiment of FIGS. 1 to 4B described above.

The motor 510 fixedly mounted in the housing 600 may rotate the drive pully 512 attached to, or directly formed on, a motor shaft. The drive pully 512 is rotatably engaged with the multi-stage drive mechanism 520. In the exemplary embodiment, the multi-stage drive mechanism 520 may be a dual-stage drive mechanism comprising a first stage belt assembly 530 and a second stage gear assembly 540. The multi-stage drive mechanism 520 may be configured to multiple torque from the motor 510 to supply braking force to the brake caliper 110. As shown in FIG. 5A, the first stage belt assembly 530 may comprise a drive belt 531 and a first stage driven pully 532. The drive pully 512 of the motor 510 and the first stage driven pully 532 are rotatably connected to each other vice the drive belt 531.

The multi-stage drive mechanism 520 further comprises a second stage gear assembly 540. The first stage belt assembly 530 of FIG. 5A is operably connected to the second stage gear assembly 540 of FIG. 5B. In the exemplary embodiment of FIGS. 5A and 5B, the first stage driven pulley 532 of the first stage belt assembly 530 of FIG. 5A is fixedly coupled to the second stage drive gear 541 of the second stage gear assembly 540 of FIG. 5B in order to deliver torque of the first stage driven pulley 532 to the second stage drive gear 541.

The second stage drive gear 541 of the second stage gear assembly 540 and the first rotatable part 210-1 of the first ball-screw mechanism 200-1 rotatably connected with each other. Each of the first rotatable part 210-1 of the first ball-screw mechanism 200-1 and the second stage drive gear 541 of the second stage gear assembly 540 has an outer surface that engages each other. The outer surfaces of the first rotatable part 210-1 of the first ball-screw mechanism 200-1 and the second stage drive gear 541 of the second stage gear assembly 540 can have any suitable structure, contour or texture to help ensure a contact between the second stage drive gear 541 and the gear portion 210 of the first rotatable part 210-1 of the first ball-screw mechanism 200-1. For example, the outer surfaces of the second stage drive gear 541 and the gear portion 210 of the first rotatable part 210-1 of the first ball-screw mechanism 200-1 can include toothed mating protruding and/or notches formed thereon.

An idler 550 is rotatably positioned between the first rotatable part 210-1 of the first ball-screw mechanism 200-1 and the second rotatable part 210-2 of the second ball-screw mechanism 200-2 to transmit rotation from the first rotatable part 210-1 of the first ball-screw mechanism 200-1 to the second rotatable part 210-2 of the second ball-screw mechanism 200-2. Accordingly, the motor 510 can rotate both the first rotatable part 210-1 of the first ball-screw mechanism 200-1 and the second rotatable part 210-2 of the second ball-screw mechanism 200-2 at the same time and in the same direction through the multi-stage drive mechanism 520 and the idler 550, and the rotation of the first rotatable part 210-1 of the first ball-screw mechanism 200-1 and the second rotatable part 210-2 of the second ball-screw mechanism 200-2 causes the first ball-screw mechanism 200-1 and the second ball-screw mechanism 200-2 to move the brake pad assembly 120 toward or away from the brake rotor 125 depending on the rotation direction of the motor 510.

Further, each of the brake pad footings 205 of the first ball-screw mechanism 200-1 and the second ball-screw mechanism 200-2 can be configured or structured differently for providing uniform pad pressure distribution in order to aid for robust performance. The brake pad footing 205 can have various shapes, for example, but not limited to, an oval shape, a round shape, a polygonal shape, of any shape which can provide uniform pad brake pressure, distribution.

Although the example embodiments have been described in detail, it should be understood that various changes, substitutions and alterations can be made herein without departing from the spirit and scope of the present disclosure as defined by the appended claims.

Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding embodiments described herein may be utilized according to the embodiments and alternative embodiments. Accordingly, the appended claims are intended to include within their scope such processes, machines, manufacture, compositions of matter, means, methods, or steps.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A brake assembly comprising:
    a rotatable part configured to be rotated by an actuator;
    a fixed part comprising an outer ball nut fixed to a housing;
    a rotatable and translatable part comprising an outer ball screw and an inner ball nut, wherein the outer ball screw is operably coupled with the outer ball nut of the fixed part through first rolling bodies, and the rotatable and translatable part comprising the outer ball screw and the inner ball nut is operably coupled with the rotatable part and is configured to be rotated relative to the outer ball nut and axially translated relative to the rotatable part and the outer ball nut of the fixed part simultaneously by rotation of the rotatable part;

a translatable part comprising an inner ball screw operably coupled with the inner ball nut of the rotatable and translatable part through second rolling bodies, the inner ball screw configured to be axially translated relative to the rotatable and translatable part comprising the outer ball screw and the inner ball nut by rotation of the inner ball nut to move a brake pad assembly; and the brake pad assembly configured to be movable relative to a rotor in response to axial translation of the inner ball screw of the translatable part.

2. The brake assembly of claim 1, wherein the rotatable part has an inner wall forming a cavity, at least a part of the rotatable and translatable part comprising the outer ball screw and the inner ball nut is movable within the cavity of the rotatable part, and one or more grooves are formed on the inner wall of the rotatable part in an axial direction.

3. The brake assembly of claim 2, wherein the rotatable and translatable part comprising the outer ball screw and the inner ball nut has one or more protrusions disposed in the one or more grooves formed on the inner wall of the rotatable part, so that, the one or more protrusions of the rotatable and translatable part comprising the outer ball screw and the inner ball nut are slidable along the one or more grooves formed on the inner wall of the rotatable part in the axial direction in response to the rotation of the rotatable part.

4. The brake assembly of claim 3, wherein two of the protrusions of the rotatable and translatable part comprising the outer ball screw and the inner ball nut are positioned opposite to each other with respect to a center of the rotatable and translatable part.

5. The brake assembly of claim 2, further comprising one or more keys fixed to the rotatable and translatable part comprising the outer ball screw and the inner ball nut, wherein a part of the one or more keys is slidably disposed in the one or more grooves formed on the inner wall of the rotatable part so that the one or more keys are slidable along the one or more grooves formed on the inner wall of the rotatable part in the axial direction in response to the rotation of the rotatable part.

6. The brake assembly of claim 5, wherein the part of the one or more keys disposed in the one or more grooves formed on the inner wall of the rotatable part has a substantially spherical shape.

7. The brake assembly of claim 5, wherein two of the keys fixed to the rotatable and translatable part comprising the outer ball screw and the inner ball nut are positioned opposite to each other with respect to a center of the rotatable and translatable part.

8. The brake assembly of claim 2, wherein two of the grooves formed on the inner wall of the rotatable part are positioned opposite to each other with respect to a center of the rotatable part.

9. The brake assembly of claim 1, wherein an outer surface of the rotatable and translatable part comprising the outer ball screw and the inner ball nut has a stepped shape having a larger diameter portion including the outer ball screw and a smaller diameter portion configured to be slidably coupled with an inner wall of the rotatable part.

10. The brake assembly of claim 1, further comprising a bush or bearing positioned between the rotatable part and the housing so that the rotatable part is rotatable relative to the housing.

11. The brake assembly of claim 1, further comprising one or more bars disposed between the outer ball screw and the inner ball nut of the rotatable and translatable part so that the one or more bars fixedly couple between the outer ball screw and the inner ball nut and the outer ball screw and the inner ball nut are fixed together.

12. The brake assembly of claim 11, wherein one or both end portions of the one or more bars disposed between the outer ball screw and the inner ball nut of the rotatable and translatable part have a larger diameter than a middle portion of the one or more bars.

13. The brake assembly of claim 1, further comprising a footing positioned between the brake pad assembly and the translatable part comprising the inner ball screw, the footing fixed to the translatable part comprising the inner ball screw.

14. The brake assembly of claim 1, further comprising an actuator comprising:
a motor;
a first stage belt mechanism including a drive belt, and a driven pulley operably connected to the motor via the drive belt; and
a second stage gear mechanism including a drive gear fixedly coupled with the driven pulley of the first stage belt mechanism and rotatably coupled with a gear portion of the rotatable part.

15. A brake assembly comprising:
a plurality of ball-screw mechanisms, each of the plurality of ball-screw mechanisms comprising:
a rotatable part,
a fixed part comprising an outer ball nut fixed to a housing,
a rotatable and translatable part comprising an outer ball screw and an inner ball nut, wherein the outer ball screw is operably coupled with the outer ball nut of the fixed part through first rolling bodies, and the rotatable and translatable part comprising the outer ball screw and the inner ball nut is operably coupled with the rotatable part and is configured to be rotated relative to the outer ball nut and axially translated relative to the rotatable part and the outer ball nut of the fixed part simultaneously by rotation of the rotatable part, and
a translatable part comprising an inner ball screw operably coupled with the inner ball nut of the rotatable and translatable part through second rolling bodies, the inner ball screw configured to be axially translated relative to the rotatable and translatable part comprising the outer ball screw and the inner ball nut by rotation of the inner ball nut to move a brake pad assembly;
an actuator configured to rotate one rotatable part of one of the plurality of ball-screw mechanisms;
an idler rotatably connecting between the one rotatable part of the one of the plurality of ball-screw mechanisms and an other rotatable part of an other of the plurality of ball-screw mechanisms, the idler configured to transmit rotation from the one rotatable part of the one of the plurality of ball-screw mechanisms to the other rotatable part of the other of the plurality of ball-screw mechanisms; and
a brake pad assembly, wherein each translatable part of each of the plurality of ball-screw mechanisms is operably connected to the brake pad assembly, and the brake pad assembly is configured to be movable relative to a rotor in response to axial translation of each translatable part of each of the plurality of ball-screw mechanisms.

16. The brake assembly of claim 15, wherein each of the plurality of ball-screw mechanisms comprises a footing positioned between the brake pad assembly and the translatable part comprising the inner ball screw, the footing fixed to the translatable part comprising the inner ball screw, and structured to provide uniform brake pressure distribution.

17. The brake assembly of claim 16, wherein the footing has one of an oval shape, a round shape, or a polygonal shape.

\* \* \* \* \*